United States Patent [19]

Sawyer

[11] 4,218,811
[45] Aug. 26, 1980

[54] METHOD FOR REPAIRING DAMAGED BLEEDER VALVE APERTURES

[76] Inventor: Thomas C. Sawyer, 19435 Lancashire Rd., Detroit, Mich. 48223

[21] Appl. No.: 893,698

[22] Filed: Apr. 5, 1978

Related U.S. Application Data

[62] Division of Ser. No. 659,653, Feb. 20, 1976, Pat. No. 4,103,762.

[51] Int. Cl.² .............................................. B23P 7/00
[52] U.S. Cl. .............................. 29/157.1 R; 29/402.11
[58] Field of Search .............. 29/157.1 R, 427, 401 R, 29/401 A, 401 B, 401 C, 401 D, 401 E, 401 F, 525, 402.09, 402.11–402.17; 188/352; 137/315, 454.2, 454.5, 454.6, 15; 92/86, 78, 79; 251/222

[56] References Cited

U.S. PATENT DOCUMENTS

| | | | |
|---|---|---|---|
| 2,053,006 | 9/1936 | Noss | 29/401 D |
| 2,275,310 | 3/1942 | Nuttall | 29/401 F |
| 2,431,210 | 11/1947 | Tamm et al. | 92/78 |
| 2,795,221 | 6/1957 | Braendel | 29/509 |
| 3,050,080 | 8/1962 | Pagano | 188/352 |
| 3,221,844 | 12/1965 | Davis et al. | 188/352 |
| 3,301,282 | 1/1967 | Fresolone, Jr. | 188/352 |
| 3,557,464 | 1/1971 | Burgess | 29/401 |
| 3,619,892 | 11/1971 | Roeschlaub | 29/401 E |
| 3,683,873 | 8/1972 | Tarter | 29/427 |
| 3,694,838 | 10/1972 | Runton | 29/401 R |
| 3,727,638 | 4/1973 | Zaremba et al. | 137/572 |
| 3,789,961 | 2/1974 | Warwick | 188/352 |
| 3,802,055 | 4/1974 | Jackson | 29/401 R |
| 3,809,359 | 5/1974 | Truelove, Sr. | 188/352 |
| 3,828,415 | 8/1974 | Kammeraad et al. | 29/401 R |
| 3,847,499 | 11/1974 | Heyworth | 29/401 |

Primary Examiner—Daniel C. Crane
Attorney, Agent, or Firm—Harness, Dickey & Pierce

[57] ABSTRACT

There is disclosed herein a method for repairing a bleeder valve aperture on a disc brake caliper or the like and a device for use in practicing this method thereby eliminating the necessity of replacing the caliper housing. The repair method includes the drilling of the damaged aperture, tapping the enlarged aperture to create new threads thereon, and the insertion of a repair sleeve device having an externally threaded surface and a valve seat and threaded surface machined internally therein. This repair sleeve device is designed to cooperate with the bleeder valve and the caliper housing so as to allow the bleeder valve to function normally. Alternatively, a repair sleeve device having a smooth external surface and designed to be press fitted into an accurately reamed aperture is also contemplated.

4 Claims, 6 Drawing Figures

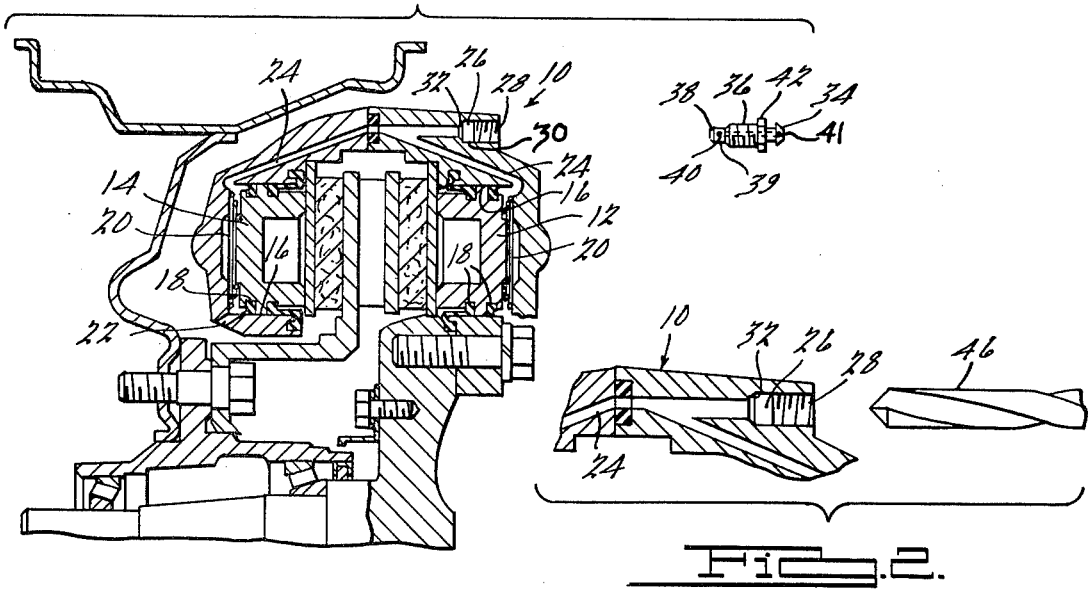
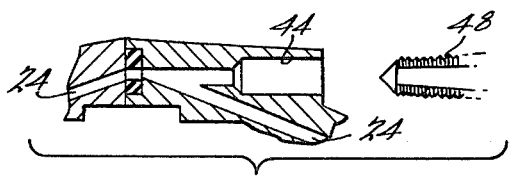
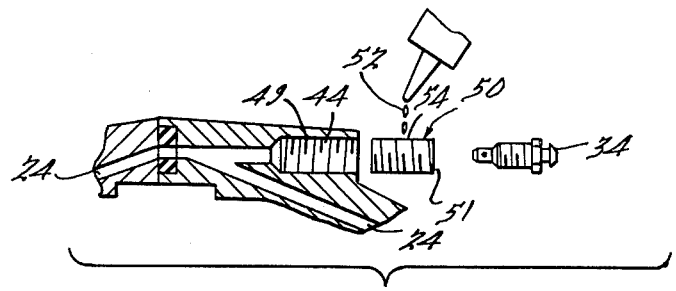
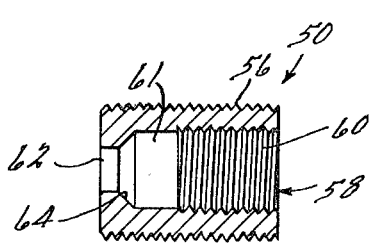
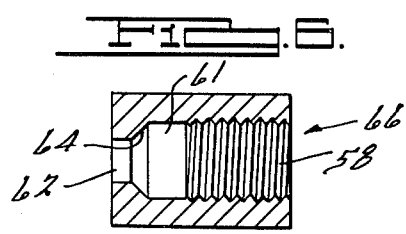

METHOD FOR REPAIRING DAMAGED BLEEDER VALVE APERTURES

This is a division of application Ser. No. 659,653, filed Feb. 20, 1976, now U.S. Pat. No. 4,103,762.

BACKGROUND AND SUMMARY OF THE INVENTION

Conventional automotive disc brake systems comprise a hermetically sealed system employing a fluid for transmission of braking forces exerted by the vehicle operator on the brake pedal to the rotating wheels of the vehicle. Such systems generally include a master cylinder having a fluid reservoir and a piston responsive to actuation of the brake pedal, which causes the fluid to be forced through a distribution system running to each of the wheels. This pressurized fluid actuates another piston at each of the wheels, causing the brake shoes or pads to engage a rotating disc secured to each wheel.

In these disc brake systems, the fluid actuated pistons located at the individual wheels are housed in a caliper which also holds and restrains the brake pads thereby providing the braking force. As these forces are substantial, the housing must necessarily be a massive structure. Further, in that it is necessary to allow the brake pads to move axially with the piston while restraining both radial and circumferential movement of the brake pads, the pad supporting structure of the caliper must be accurately constructed. Also, the brake caliper will have provided in it a fluid chamber and fluid passageways communicating with a bleeder valve, the fluid chamber and provisions for external connection of a brake line. For these reasons, the caliper of a disc brake is necessarily an expensive component of the brake system when compared to the wheel cylinders of the older conventional brake systems, and, thus, it becomes highly desirable to avoid replacement of this component whenever possible.

It is extremely important to the operating efficiency of all fluid actuated braking systems to insure against the presence ao any air being trapped within the system. As air is a compressible gas, the presence of air in any portion of the fluid system will absorb, rather than transmit, the pressure created by the master cylinder. Accordingly, bleeder valves are provided on the calipers which communicate with the fluid passageways to allow air to be expelled from the system. These bleeder valves are normally threaded into an aperture in the caliper housing and have a valve body which engages an accurately machined valve seat contained within the caliper. Occasionally, the threaded bleeder valve aperture may become damaged due to corrosion, lack of necessary care, or the like. Accordingly, the present invention provides a method and device by which this aperture may be repaired with a minimum of effort and expense, thus eliminating the necessity of replacing the caliper itself, as well as the associated expense and delay of repair in attempting to obtain a replacement caliper housing.

Other features and advantages of the present invention will become apparent from a review of the following detailed description of the preferred embodiment in which reference is made to the following drawings.

BRIEF DESCRIPTION OF THE DRAWINGS

FIG. 1 shows a sectionalized view of a conventional disc brake caliper shown in operable relationship to a portion of a vehicle wheel suspension system shown in section;

FIG. 2 shows a sectionalized portion of the disc brake caliper of FIG. 1 having a damaged bleeder valve aperture about to be drilled in preparation for repair;

FIG. 3 is similar to FIG. 2 showing a sectionalized portion of the disc brake caliper with a bleeder valve aperture which has been drilled and is now about to be tapped;

FIG. 4 is similar to FIGS. 2 and 3 showing a sealing compound being applied to a repair sleeve device which is about to be installed in prepared bleeder valve aperture;

FIG. 5 shows a longitudinally sectionalized view of a repair sleeve device in accordance with the present invention; and FIG. 6 shows a longitudinally sectionalized view of another embodiment of the repair sleeve device of the present invention.

DESCRIPTION OF THE PREFERRED EMBODIMENT

Referring now to FIG. 1, there is shown a conventional disc brake caliper 10 having dual hydraulically actuated pistons 12 and 14 contained thereon. Pistons 12 and 14 are each moveable within a cylndrical bore 16 and each have an annular gasket 18 therearound which seals a fluid chamber 20 located behind each of pistons 12 and 14. Communicating with fluid chambers 20 are fluid passageways 22 and 24, one of which extends externally to means for connection of a brake line running from a master cylinder. The other fluid passageway 24 extends externally to a bleeder valve aperture 26. Bleeder valve aperture 26 has a threaded wall portion 28 extending into the caliper housing 10, an unthreaded portion 30 of approximately the same diameter as the threaded portion 28 extending an additional distance into the caliper housing and terminating at valve seat 32 which joins the bleeder valve aperture 26 with the internal fluid passageway 24 of the caliper 10. Fluid passageway 24 is centered in the bleeder valve aperture 26 and has a diameter substantially smaller than that of the bleeder valve aperture. Valve seat 32 comprises a tapered portion interconnecting the inner end of the bleeder valve aperture 26 and fluid passageway 24. A bleeder valve 34 is shown in FIG. 1 adjacent to bleeder valve aperture 26. Bleeder valve 34 is generally cylindrical in shape having a threaded portion 36 extending along its surface for engaging and retaining the valve in aperture 26. One end of bleeder valve 34 has a tapered conical shaped portion 38 complimentary to the valve seat 32 of the caliper, which cooperates with valve seat 32 to effectively seal the fluid passageway 24 when bleeder valve 34 is in a closed position. Bleeder valve 34 also has an unthreaded portion 39 located between threaded portion 36 and conical shaped portion 38 which is of a slightly smaller diameter than threaded portion 36. A small aperture 40 is disposed in unthreaded portion 39 and extends radially into bleeder valve 34 for a distance approximately half the diameter of unthreaded portion 39. A second aperture 41 extends longitudinally inward from the outer end of bleeder valve 34 terminating at the point of intersection with aperture 40. Threaded portion 36 of the bleeder valve terminates near its outer end at a hexagonal shape annular flange 42 which provides means by which a wrench may engage the bleeder valve 34 to loosen same during the bleeding of the brake lines.

Whenever it becomes necessary to bleed the brake lines of a vehicle, an individual will connect a rubber tube or the like over the bleeder valve 34, submerse the opposite end in a container having a small amount of brake fluid therein, then loosen the bleeder valve so as to allow fluid in the caliper passageways 24 and 22, fluid chambers 20, and brake lines to escape through the bleeder valve 34 expelling any air trapped within the hydraulic system as the brake pedal is alternately depressed and released. This bleeding operation is generally only performed at infrequent intervals, such as when disc brake pads are replaced or some other problem necessitating opening up of the otherwise hermetically sealed fluid system. As a result of this infrequent use, the bleeder valve may become frozen due to the corrosive conditions encountered at their location adjacent the vehicle wheels and the attempt to remove it resulting in the bleeder valve breaking off inside the aperture. Various other factors may also result in damage to the aperture, such as overtightening of the bleeder valve resulting in stripped threads or even rocks or other debris striking the valve. In order to effect a repair of a damaged bleeder valve aperture, it is first necessary to remove the disc brake caliper from its mountings, disconnect the brake line, and remove the pistons therefrom. Next, as shown in FIG. 2, the damaged aperture 26 is drilled out by means of a conventional twist drill 46 or the like. It is necessary that the drill have a diameter slightly larger than the diameter of the aperture 26 in order to allow for the wall thickness of the repair sleeve device, as described in greater detail below. Further, aperture 26 must be lengthened so as to allow the threads of the repair sleeve device to fully engage the caliper housing 10.

Next, as best seen in FIG. 3, the drilled aperture 44 is threaded by means of a conventional tap 48. As such taps are tapered so as to gradually form the peaks and valleys of the new threads, it will be necessary to cause the tap to enter the aperture a slightly greater distance than the length of the repair sleeve device so as to fully form the threads which the repair sleeve device will engage.

As is readily apparent, the operation of drilling and tapping will necessarily destroy the previously machined valve seat contained in the caliper housing. While it would be possible to machine a new valve seat in this aperture, such operations require specialized machinery and skill, neither of which is likely to be possessed by the mechanic attempting to repair the brake system. Accordingly, a repair sleeve device is provided which has a valve seat machined internally therein, as is described in greater detail below.

The aperture having thus been drilled and tapped as described above, the caliper housing is now carefully washed and cleaned so as to insure that all the metal particles resulting from the drilling and tapping thereof are removed. Should any such particles remain after the assembly of the caliper, they may result in the scoring of the piston walls, the plugging of the fluid passageways, or other like damage to the caliper and result in possible failure of the braking system itself.

Once the caliper has been drilled and tapped, as described above, the repair sleeve device 50 may be threaded into the aperture as shown in FIG. 4. In order to facilitate this operation, it is generally desirable to insert the bleeder valve 34 into the repair sleeve device 50 so as to provide an extension for engagement by wrench or the like, thus insuring the repair sleeve device is fully inserted into the aperture 44 and surface 51 is flush with the caliper housing. Additionally, it is necessary that a suitable sealant 52 be applied to the threads 54 of the repair sleeve device prior to its installation in the aperture so as to insure that when pressure is exerted on the fluid within the system, it will not leak around threads 54. There are many such sealants currently available on the market and one which has been found particularly well suited to this application is Lockite "Shaft and Bearing Mount". This sealant, when cured, also serves to retain the repair sleeve device 50 in the aperture 44.

The caliper may now be reassembled and installed on the vehicle and the balance of the brake repair completed in normal fashion.

Reference is now made to FIG. 5 in which there is shown in section a repair sleeve device 50 as previously mentioned. Repair sleeve device 50 is generally cylindrical in shape having external threads 56 disposed along the longitudinal walls thereof. Threads 56 will correspond and cooperate with threads 49 of the disc brake caliper bleeder valve aperture 44. An aperture 58 extends internally of the bleeder valve repair sleeve from one end thereof terminating a short distance from the opposite end and having threads 60 along a portion thereof, which are complimentary to those of a standard bleeder valve. Aperture 58 also has an unthreaded smooth wall portion 61 extending inward from the threaded portion 60. A second aperture 62 extends longitudinally into the sleeve 50 from the opposite end thereof. Second aperture 62 is concentric with aperture 58 and of a substantially smaller diameter. A valve seat portion 64, having inclined conical shaped walls, extends between and connects the two apertures 58 and 62. When installed in a disc brake caliper, this repair device having the internal valve seat 64 will provide the necessary sealing means for the bleeder valve assembly.

Referring now to FIG. 6, a second embodiment of the repair sleeve is shown therein at 66. Repair device 66 is identical to that described with reference to FIG. 5 having a large diameter threaded aperture 58 extending from one end thereof, a smaller unthreaded aperture 62 extending inward from the opposite end, and a valve seat portion 64 extending between the two aperture portions. This repair device, however, does not have a threaded external wall but, rather, has an accurately machined, smooth, longitudinal wall surface suitable for a press fit installation. When the repair device 66, as shown in FIG. 6, is used, the bleeder valve aperture of the disc brake caliper is first drilled as previously described. The drilled aperture is then accurately reamed to a proper diameter to allow for a press fit insertion of the repair sleeve device. A sealing composition, such as that previously described, is then applied to the external longitudinal wall surfaces of the repair sleeve, and the repair sleeve device is then pressed into the previously prepared aperture.

The disc brake caliper, having the repair sleeve device of the present invention installed thereon, is now ready for reassembly of the bleeder valve, pistons, and brake pads and installation on the vehicle, all of which is accomplished in a conventional manner.

There is thus disclosed herein a method by which a disc brake caliper may be easily repaired with minimal amount of time and effort, thereby minimizing the cost of such repairs to the owner of the vehicle. While this device has been described with reference to a disc brake caliper, the scope of the invention herein should not be so limited but may be practiced with application to other components of the brake system having bleeder valve assemblies; for example, the master cylinder. Additionally, in certain vehicles, a hydraulically actuated clutch may be employed, in which case, bleeder valves contained therein may be repaired in like manner, as described herein. It is thus apparent that various changes, modifications, and variations may be made without departing from the scope of the invention which should be limited only by the scope of the appended claims.

I claim:

1. In a disc brake caliper having a piston movably disposed within said housing, passage means for conducting pressurized hydraulic fluid to said piston so as to actuate said piston, a bleeder passage communicating between said passage means and a bleeder valve aperture, said bleeder valve aperture opening outwardly of said housing, and having a threaded portion adjacent the outer end thereof and a valve seat disposed adjacent the inner end of said threaded portion, said bleeder valve seat being integrally formed in said disc brake caliper, a method of repairing said bleeder valve aperture comprising:

removing said disc brake caliper from said motor vehicle;

disassembling said caliper and removing said piston;

increasing the diameter and length of said bleeder valve aperture by a drilling operation, said drilling operation removing said valve seat;

accurately sizing said bleeder valve aperture;

cleaning said disc brake caliper so as to remove any metal particles resulting from said drilling and sizing operations; and providing a new bleeder valve seat comprising a generally cylindrical repair sleeve device, said repair sleeve device having a bleeder valve opening therein including a threaded portion adjacent the outer end thereof and a valve seat adjacent the inner end of said threaded portion, threadedly inserting a bleeder valve into said bleeder valve opening provided in said repair sleeve device, applying a sealant to the external surface of said repair sleeve device; and installing said repair sleeve device within said accurately sized aperture by applying a force to said bleeder valve, said sealant being operative to create a sealing relationship between said caliper and said repair sleeve device whereby said repair sleeve device will be retained within said aperture and operate to provide a new valve seat for the bleeder valve.

2. The method as set forth in claim 1 wherein said aperture is accurately sized by threading said aperture; said repair sleeve device having external threads thereon.

3. The method as set forth in claim 1 wherein said aperture is accurately sized by reaming said aperture so as to create a press fit of said repair sleeve device in said aperture; said repair sleeve device having substantially smooth sidewalls adapted for a press fit installation.

4. The method as set forth in claim 1 wherein said threaded portion of said sleeve device has a predetermined diameter, said repair sleeve further including a second longitudinal aperture of a diameter smaller than said predetermined diameter in the inner end; said valve seat extending between said first and second apertures.

* * * * *